United States Patent
Gürsu et al.

(10) Patent No.: US 12,439,306 B2
(45) Date of Patent: Oct. 7, 2025

(54) TRIGGERING OF LOW LAYER MOBILITY THROUGH INTER CELL BEAM MANAGEMENT PROCEDURE

(71) Applicant: Nokia Technologies Oy, Espoo (FI)

(72) Inventors: Halit Murat Gürsu, Munich (DE); Ahmad Awada, Munich (DE); Panagiotis Spapis, Munich (DE); Umur Karabulut, Munich (DE); Ali Karimidehkordi, Munich (DE); Timo Koskela, Oulu (FI); Xin Zhang, Taufkirchen (DE); Sanjay Goyal, Denville, NJ (US)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 17/985,245

(22) Filed: Nov. 11, 2022

(65) Prior Publication Data
US 2024/0163749 A1    May 16, 2024

(51) Int. Cl.
 *H04W 36/00* (2009.01)
 *H04W 16/28* (2009.01)
 *H04W 36/18* (2009.01)
 *H04W 36/32* (2009.01)

(52) U.S. Cl.
 CPC ..... *H04W 36/00837* (2018.08); *H04W 16/28* (2013.01); *H04W 36/18* (2013.01); *H04W 36/32* (2013.01)

(58) Field of Classification Search
 None
 See application file for complete search history.

(56) References Cited

U.S. PATENT DOCUMENTS

| | | | |
|---|---|---|---|
| 2024/0214888 A1* | 6/2024 | Li | H04B 17/327 |
| 2024/0348403 A1* | 10/2024 | Bai | H04L 5/0053 |
| 2024/0373311 A1* | 11/2024 | Bala | H04W 36/0055 |

OTHER PUBLICATIONS

ETSI TS 122 261 V.16.14.0 "5G; Service Requirements for the 5G System" (3GPP TS 22.261 V16.14.0 Release 16) Apr. 2021.
Huawei; 3GPP TSG RAN Meeting #94e RP-213554 "New SI: Study on Network Energy Savings for NR" Electronic Meeting, Dec. 6-17, 2021.
3GPP TS 38.213 V16.2.0 "3$^{rd}$ Generation Partnership Project; Technical Specification Group Radio Access Network; NR; Physical Layer Procedures for Control (Release 16)" Jun. 2020.

(Continued)

*Primary Examiner* — Anh Ngoc M Nguyen
(74) *Attorney, Agent, or Firm* — McCarter & English LLP

(57) ABSTRACT

An apparatus including at least one processor; and at least one non-transitory memory storing instructions that, when executed with the at least one processor, cause the apparatus to perform: receiving a combined information, where the combined information includes first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell includes the first cell or a third cell.

34 Claims, 7 Drawing Sheets

(56) References Cited

OTHER PUBLICATIONS

"Prerequisites and benefits of Lower Layer Mobility", Nokia, Nokia Shanghai Bell, 3GPP TSG-RAN WG2 Meeting #119 Electronic, R2-2208212, Aug. 2022, 13 pages.
"Scenario and Target Performance Enhancements for L1/L2 mobility", Samsun, 3GPP TSG-RAN WG2 Meeting #119 electronic, R2-2208528, Aug. 2022, 5 pages.
"Cell Switch in L1/L2-triggered Mobility", Media Tek Inc., 3GPP TSG-RAN WG2 Meeting #120, R2-2211197, Nov. 2022, 4 pages.
Communication pursuant to Article 94(3) EPC, dated May 26, 2025, issued in corresponding European Patent Application No. 23208092.9.
Nokia et al., "Discussion on L1 enhancements for L1/L2-based inter-cell mobility", 3GPP Draft; R1-2208500, Sep. 30, 2022, XP052276426.

* cited by examiner

TRIGGERING OF LOW LAYER MOBILITY THROUGH INTER CELL BEAM MANAGEMENT PROCEDURE

BACKGROUND

Technical Field

The example and non-limiting embodiments relate generally to communication handover and, more particularly, to beam level mobility.

BRIEF DESCRIPTION OF PRIOR DEVELOPMENTS

There are two types of 5G NR handovers; namely, network controlled and UE controlled. Network controlled handover is applied to 5G NR UEs in RRC CONNECTED mode. This network controlled handover is categorized into two sub types; namely, cell level and beam level.

SUMMARY

The following summary is merely intended to be an example. The summary is not intended to limit the scope of the claims.

In accordance with one aspect, an example apparatus comprises at least one processor; and at least one non-transitory memory storing instructions that, when executed with the at least one processor, cause the apparatus to perform: receiving a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

In accordance with another aspect, an example method is provided comprising: receiving with an apparatus a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

In accordance with another aspect, an example apparatus is provided with a non-transitory computer readable medium comprising program instructions that, when executed with an apparatus, cause the apparatus to perform at least the following: receiving with the apparatus a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

In accordance with another aspect, an example apparatus is provided comprising: at least one processor; and at least one non-transitory memory storing instructions that, when executed with the at least one processor, cause the apparatus to perform: determining to add first information regarding inter-cell beam management with second information regarding lower layer mobility; based upon the determining to add the first information with the second information, sending the first information and the second information together to a network entity.

In accordance with another aspect, an example method is provided comprising: determining to add first information regarding inter-cell beam management with second information regarding lower layer mobility; and based upon the determining to add the first information with the second information, sending the first information and the second information together to a network entity.

In accordance with another aspect, an example apparatus is provided with a non-transitory computer readable medium comprising program instructions that, when executed with an apparatus, cause the apparatus to perform at least the following: determining to add first information regarding inter-cell beam management with second information regarding lower layer mobility; and based upon the determining to add the first information with the second information, sending the first information and the second information together to a network entity.

In accordance with another aspect, an example apparatus is provided comprising: at least one processor; and at least one non-transitory memory storing instructions that, when executed with the at least one processor, cause the apparatus to perform: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with another aspect, an example method is provided comprising: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with another aspect, an example apparatus is provided with a non-transitory computer readable medium comprising program instructions that, when executed with an apparatus, cause the apparatus to perform at least the following: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with another aspect, an example apparatus is provided comprising: at least one processor; and at least one non-transitory memory storing instructions that, when executed with the at least one processor, cause the apparatus to perform: receiving, from a network entity, first information for inter-cell beam management and second information for lower layer mobility; and determining, based upon the receiving of the first information for inter-cell beam management and second information for lower layer mobility, mobility information to be sent from the apparatus.

In accordance with another aspect, an example method is provided comprising: receiving from a network entity first information for inter-cell beam management and second information for lower layer mobility; and determining, based upon the receiving of the first information for inter-cell beam management and second information for lower layer mobility, mobility information to be sent from the apparatus.

In accordance with another aspect, an example apparatus is provided with a non-transitory computer readable medium comprising program instructions that, when executed with an apparatus, cause the apparatus to perform at least the following: receiving from a network entity first information for inter-cell beam management and second information for lower layer mobility; and determining, based upon the receiving of the first information for inter-cell beam management and second information for lower layer mobility, mobility information to be sent from the apparatus.

According to some aspects, there is provided the subject matter of the independent claims. Some further aspects are provided in subject matter of the dependent claims.

BRIEF DESCRIPTION OF THE DRAWINGS

The foregoing aspects and other features are explained in the following description, taken in connection with the accompanying drawings, wherein.

DETAILED DESCRIPTION

Figure 1:
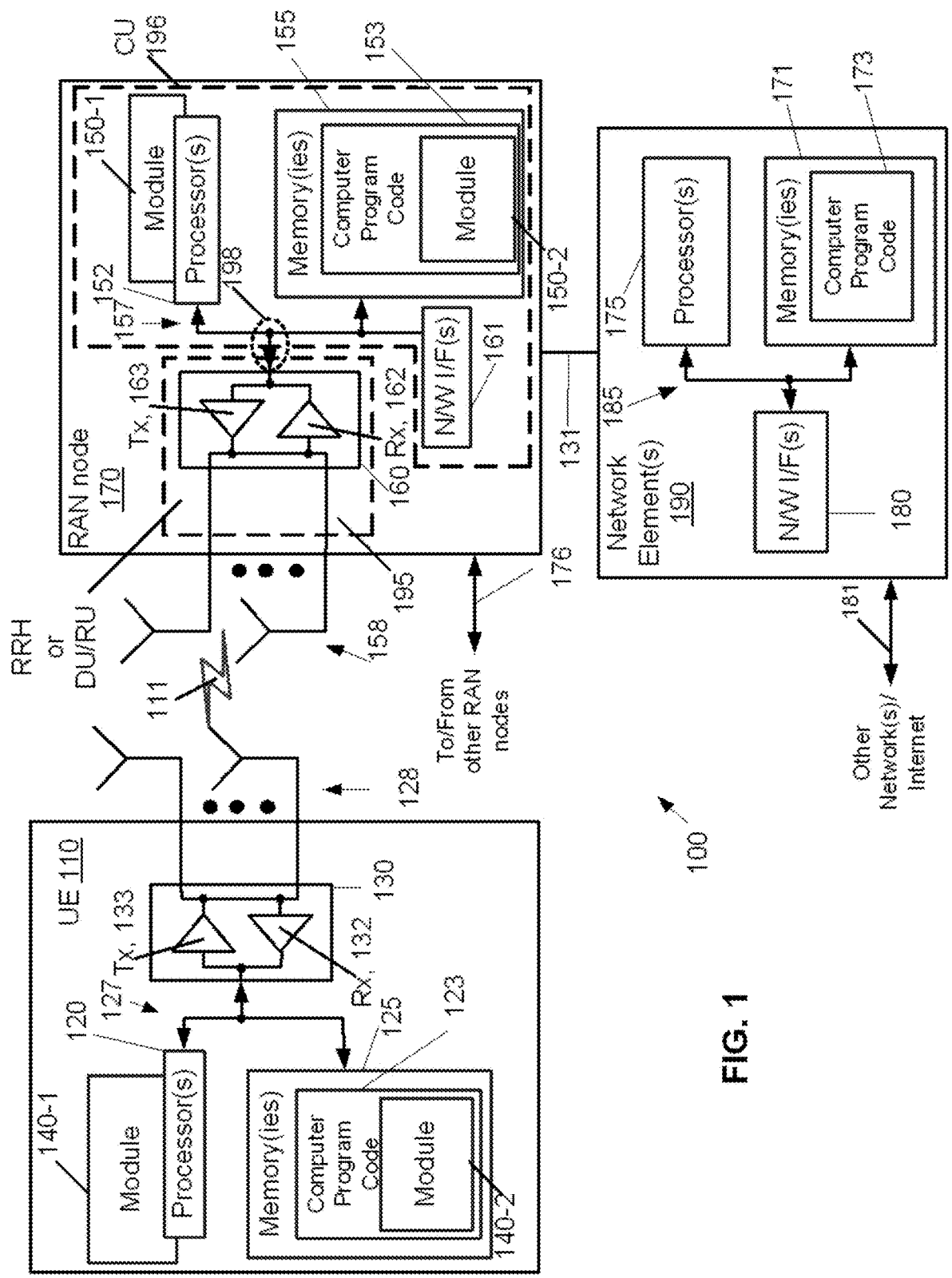
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
BWP Bandwidth Part
CSI channel state information
CU central unit
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
ICBM inter-cell beam management
I/F interface
LLM lower layer mobility
LTE long term evolution
LTM local traffic manager
MAC medium access control
MME mobility management entity
ng or NG new generation
ng-eNB or NG-eNB new generation eNB
NR new radio
NAY or NW network
PCI Physical Cell Identity
PDCP packet data convergence protocol
PHY physical layer
RAN radio access network
RB resource block
Rel release
RF radio frequency
RLC radio link control
RRH remote radio head
RRC radio resource control
RU radio unit
Rx receiver
SGW serving gateway
SMF session management function
SSB synchronization signal block
TCI Transmission Configuration Indicator
TDD time division duplex
TRP Transmission Reception Point
TS technical specification
Tx transmitter
UE user equipment (e.g., a wireless, typically mobile device)
UL uplink
UPF user plane function
WI work item Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
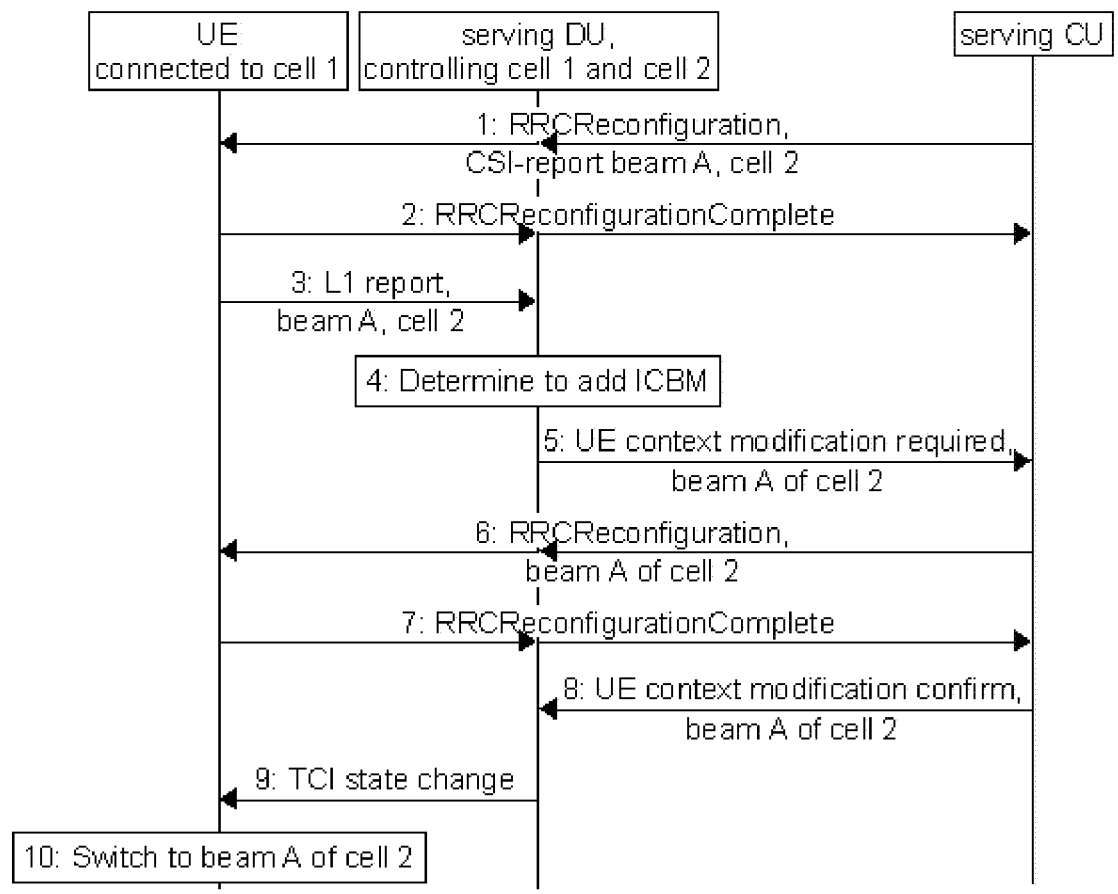
FIG. 2 is a diagram illustrating a message sequence chart for intra-DU inter-cell beam management operation.
Figure 3:
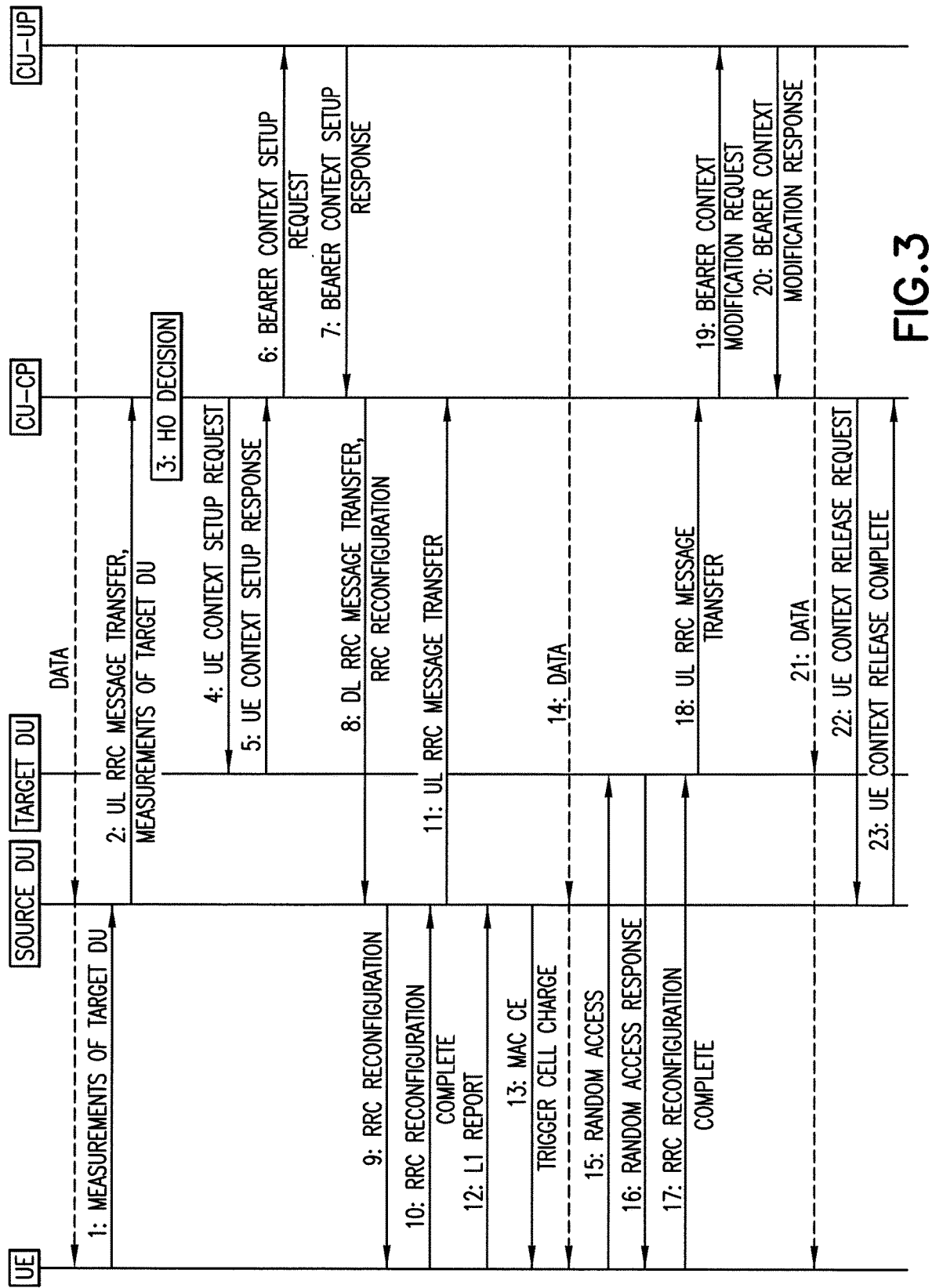
FIG. 3 is a diagram illustrating a message sequence chart for L1/2 centric mobility.

Rel. 17 introduces intra-DU inter-cell beam management. Beam level mobility does not require explicit RRC signaling to be triggered. Beam level mobility can be within a cell, or between cells. The latter is referred to as inter-cell beam management (ICBM). FIG. 2 illustrates one example of message sequence chart for intra-DU inter-cell beam management operation. For ICBM, a UE can receive or transmit UE dedicated channels/signals via a TRP associated with a PCI different from the PCI of a serving cell, while non-UE-dedicated channels/signals can only be received via a TRP associated with a PCI of the serving cell. The gNB provides via RRC signaling the UE with measurement configuration containing configurations of SSB/CSI resources and resource sets, reports and trigger states for triggering channel and interference measurements and reports. In case of ICBM, a measurement configuration includes SSB resources associated with PCIs different from the PCI of a serving cell. Beam level mobility is then dealt with at lower layers by means of physical layer and MAC layer control signaling, and RRC is not required to know which beam is being used at a given point in time.

In the example shown in FIG. 2, the message sequence may comprise:

Step 0: UE is connected to cell 1 and does not have inter-cell beam management active.

Steps 1-2: CU configures the UE with L1 measurements for beam A (or Reference Signal index, i.e., SSB or CSI-RS index) of neighbor cell 2 (as an example) through RRCReconfiguration.

More than one beam can be configured.

The CU can configure the UE with a measurement gap, in case the target cell operates in another BW then the BWP of the UE.

Step 3: UE reports L1 measurements for beam A of cell to the DU.

Step 4: DU observes the quality of beam A of cell 2 and determines UE may benefit from radio robustness to initiate ICBM procedure and includes beam A of cell for the beam management of the UE.

Step 5-6-7-8: DU indicates the beam A of cell 2 to be included in beam management of the UE.

CU configures the UE with the beam management information provided by the DU.

CU indicates the successful completion of UE configuration to the DU.

Step 9: The DU sends a TCI state change message to activate the beam A of cell 2.

Step 10: UE initiates the ICBM procedure with the addition of beam A of cell 2 in beam management.

Inter-cell beam management (ICBM) is not aimed to provide mobility different cells, but is used to provide enhanced radio coverage to the UE as a temporary solution to avoid subsequent handovers.

Lower Layer Mobility (LLM), marked also as L1/2 inter-cell mobility, is one of the upcoming objectives for mobility enhancement in Rel. 18. According to the paradigm description, the decision about the cell change is based on L1 measurements and is made in the MAC layer in the Distributed Unit (DU). FIG. shows an example for the message exchange for the inter-DU LLM scenario. With this example:

The UE provides the L3 measurements to the source DU (step 1), which are forwarded to the CU-CP (step 2). Based on these measurements the CU-CP decides about the cell preparation (HO Decision, step 3) and proceeds in setting up the UE context in the target DU (steps 4-5). Then CU-CP communicates with CU-UP to perform the bearer context setup (steps 6-7).

In step 8 the CU-CP forwards the RRC Reconfiguration message to the source DU using a DL RRC Message Transfer and the latter forwards it to the UE (step 9). UE responds with an RRC Reconfiguration Complete which is then forwarded to the CU-CP (steps 10-11).

The UE based on its configuration provides the periodic L1 reports to the source DU (step 12).

Once the source DU decides that the UE should be handed over to another DU (i.e., target DU) it triggers the cell switch, using a MAC CE (step 13). Up to this point the UE receives data from the serving DU.

Then the UE applies the RRC configuration for the target cell of target DU-indicated by the MAC CE and performs Random Access (RA) to it (steps 15-16). After the RA procedure, the UE transmits an RRC Reconfiguration Complete to the target cell of target DU, which is forwarded to the CU-CP (steps 17-18). In another alternative, the handover execution can be performed in a RACH-less manner to the target cell (skipping step 15 and 16).

The CU-CP performs bearer modification (steps 19-20) with the CU-UP, to update the bearer setup and for the latter to start forwarding the data to the target DU (and stop forwarding data to the Source DU). Once this is completed the UE starts receiving data from the target DU (step 21).

Finally, the CU-CP releases the UE context from the source DU with a UE Context Release Request (steps 22-23).

Figure 4:
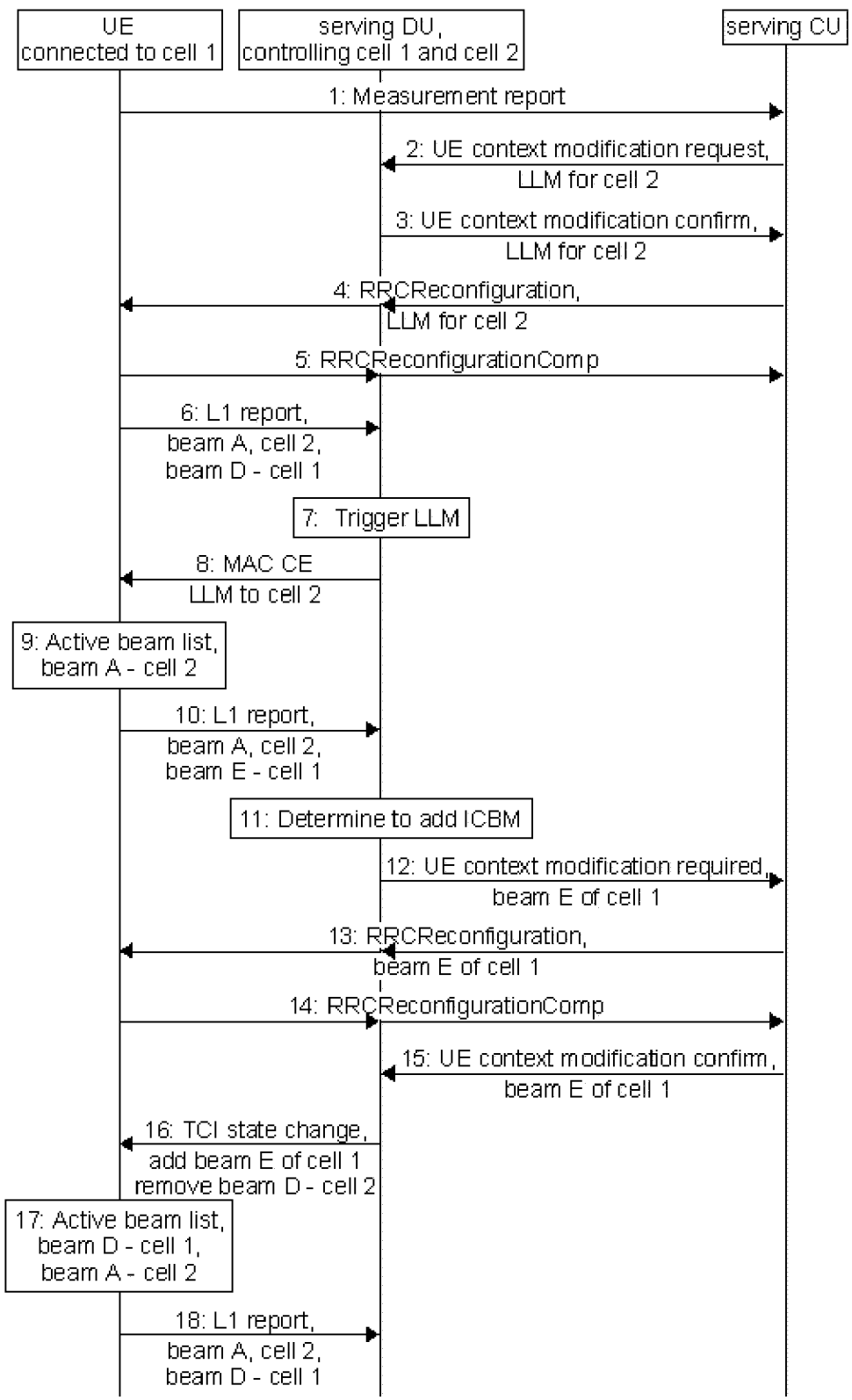
FIG. 4 is a diagram illustrating a message sequence chart for ICBM configuration after LLM execution.

Referring also to FIG. 4, an example of a Message sequence chart for ICBM configuration after LLM execution is shown, and the scenario of configuring ICBM after LLM execution is explained below. The UE is initially configured with LLM mobility towards the target cell. Afterwards, once the LLM is executed, when the DU determines ICBM needs to be initiated the ICBM has to be prepared and, once prepared, than it can be initiated. However, with this scenario of configuring ICBM after LLM execution, the preparation of LLM does not cover preparation to initiate ICBM at the time of LLM execution. This might result in limited use of a feature. LLM and ICBM are 2 different procedures. There are two reasons why LLM execution may include immediate initiation of ICBM.

A first reason is in regard to Ping-pongs. In LTM, the handover decisions are based on L1 measurements which are not very reliable (no L3 filter applied). It is expected that there will be a lot of ping-pongs. Instead of triggering a handover back to the source cell (as ping-pong), the UE can be configured with ICBM where it will still facilitate the beam of the source cell after handover to target cell. Meanwhile, it will maintain the connection to the target cell.

A second reason is in regard to minimizing the effort. Similar to the first reason noted above, in case LTM is considered, network can consider ICBM or vice versa, where there are certain commonalities of both procedures. In that case, it would be an efficient procedure to initiate ICBM at the time of LTM such as, for example, a provisional ICBM configuration which most likely be used.

With features as described herein, an apparatus and method may be provided to enable low layer mobility in relation with ICBM. A serving CU may determine to initiate LLM towards a target cell. The target DU (source DU in intra-DU scenario) may determine to configure ICBM for the target cell inside the LLM configuration. UE is then able to initiate LLM and ICBM at the same time for the target cell and a non-serving target cell. Features may include:

Aspect 1: The DU receiving a request from CU to prepare for lower layer mobility (LLM) may configure ICBM configuration included in LLM config provided back to the CU.

Aspect 2: The CU provides an RRC Reconfiguration to the UE containing an LLM configuration including another configuration for ICBM.

Aspect 3: The DU or (CU) may provide the UE with a configuration to report (L1 beam) measurement for the prepared target cell for LLM and the non-serving cell beams which is associated with target cell and configured for ICBM.

Aspect 4: UE reports (L1 beam) measurements for the prepared target cell and non-serving cell to the DU Aspect 5: DU indicates to the UE to trigger LLM to a prepared target cell and a non-serving cell configured with ICBM.

Figure 5:
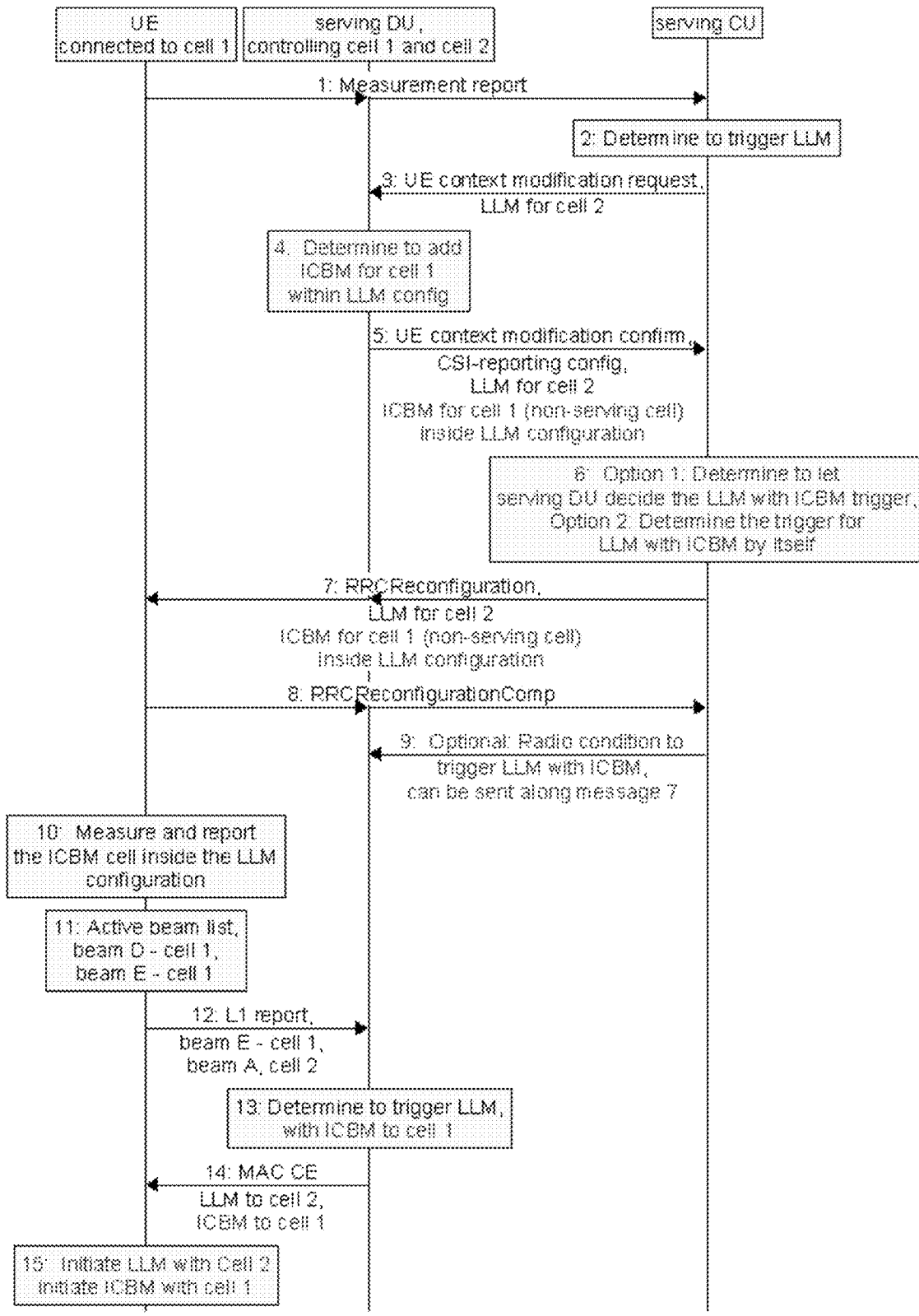
FIG. 5 is a diagram illustrating a message sequence chart for parallel ICBM and LLM configuration in an intra-DU scenario.

Referring now to FIG. 5, an example of a message sequence chart for parallel ICBM and LLM configuration in intra-DU scenario is shown comprising features as described herein. In this example the UE is connected to cell 1 and the serving DU is controlling cell 1 and cell 2. As can be seen at step 4 the serving DU may determine to add ICBM for a cell (cell 1 in this example) at least partially within the LLM configurating. As indicated in step 5, in addition to the serving DU signaling the serving CU LLM for a cell (cell 2 in this example) step 5 also includes signaling by the serving DU to the serving CU ICBM for sell 1 (the non-serving cell) inside the LLM configuration. As indicated at step 6, the serving CU may be configured to provide a first option and/or a second option. The serving CU may be able to select the option, or the serving CU may be configured to provide only one of the options. With the first option, the serving CU may determine to let the serving DU decide if the LLM is to be configured with an ICBM trigger. With the second option, the serving CU may determine the trigger for LLM with the ICBM by itself. As noted in step 7, for the signaling from the serving CU to the serving DU and the UE, RRCReconfiguration, LLM for cell 2 may be signaled along with ICBM signaling for cell 1 (non-serving cell) inside the LLM configuration. In regard to option 2 noted in step 6, step 9 may be sent along message 7. The serving CU may signal the serving DU at step 9 with an optional Radio condition to trigger LLM with ICBM. In an alternate example, step 9 might not be sent along message 7.

Steps 10-12 may be performed with the UE as normal, but at step 13 the serving DU may determine to trigger LLM as well as ICBM to cell 1. At step 14 the serving DU may signal the UE with a MAC CE for LLM to cell 2 and also signal for ICBM to cell 1. With this, the UE may then, as indicated in step 15, initiate LLM with cell 2 and initiate ICBM with cell 1.

Figure 6:
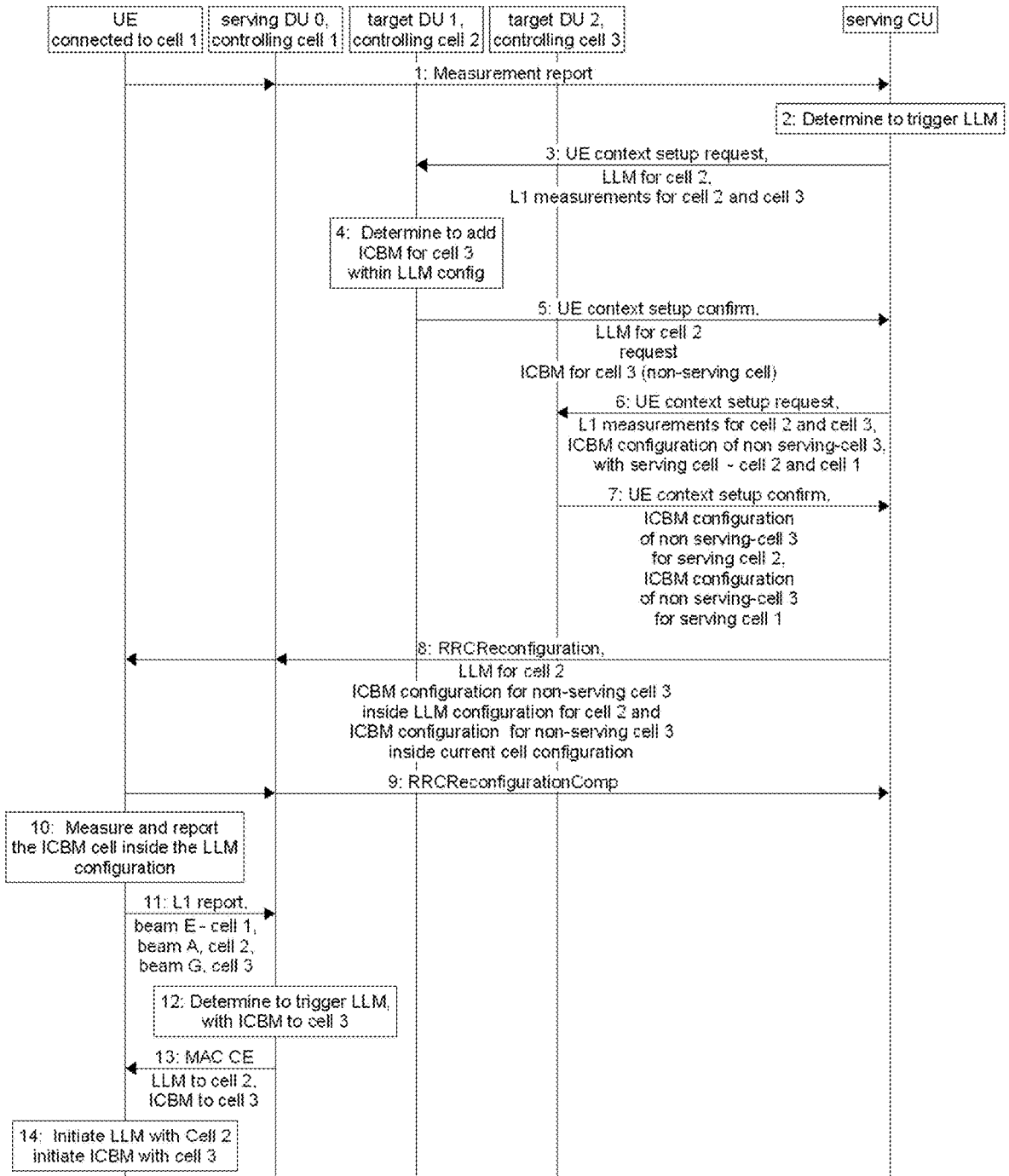
FIG. 6 is a diagram illustrating a message sequence chart for parallel ICBM and LLM configuration in an inter-DU scenario where ICBM is also inter-DU.

As noted above, FIG. 5 is in regard to the intra-DU scenario. Referring also to FIG. 6, an example in regard to a message sequence chart for parallel ICBM and LLM configuration in an inter-DU scenario where ICBM is also inter-DU is shown. In this example, there are two target DUs (target DU 1 and target DU 2) in addition to the UE, serving DU and serving CU. Serving DU 0 controls cell 1. Target DU 1 controls cell 2. Target DU controls cell 3.

At step 4 the target DU 1 may be configured to determine to add ICBM for a cell (cell 3 in this example) with LLM configuring. As indicated with step 5, the target DU 1 may signal the serving CU with both the UE context setup confirmation for LLM for cell 2 as well as a request for ICBM for cell 3 (a non-serving cell). At step 6 the serving CU may signal the target DU 2 regarding a UE context setup request, L1 measurements for cell 2 and cell 3, ICBM configuration of non-serving cell 3, and with serving cell 2 and cell 1. At step 7 the target DU may signal the serving CU with a UE context setup confirmation, in addition to ICBM configuration of non-serving cell 3 for serving cell 2, and ICBM configuration of non-serving cell 3 for serving cell 1. At step 8 the serving CU may signal the serving DU and the UE with the RRCReconfiguration for LLM for cell 2 in addition with ICBM configuration for non-serving cell 3 inside the LLM configuration for cell 2, and the ICBM configuration for non-serving cell 3 inside the current cell configuration. Steps 9-11 may be performed, but with step 12 the serving DU may determine to trigger LLM with ICBM to cell 3. At step 13 the serving DU may signal the UE with a MAC CE for LLM to cell 2 and also signal for ICBM to cell 3. With this, the UE may then, as indicated in step 14, initiate LLM with cell 2 and initiate ICBM with cell 3.

Figure 7:
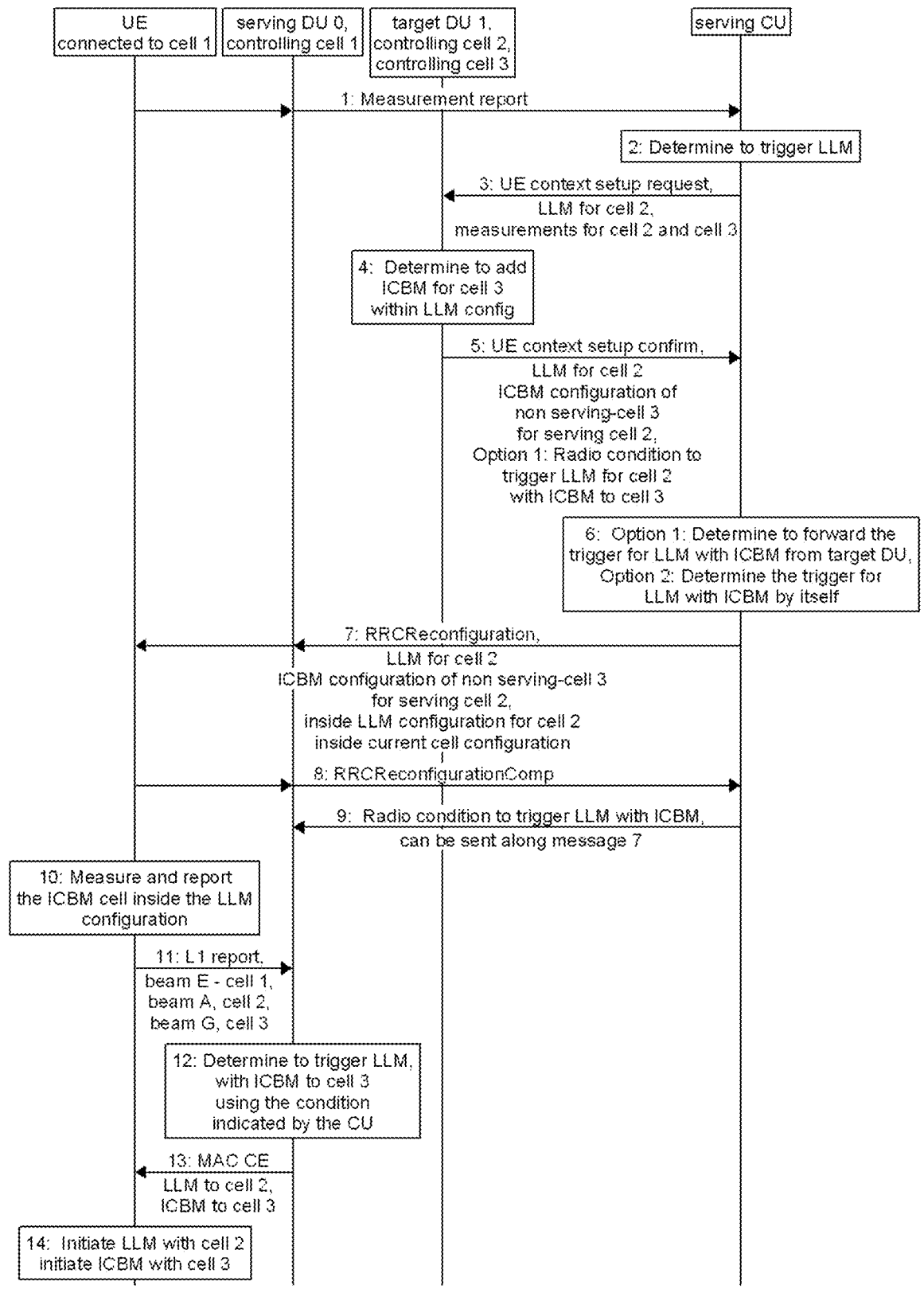
FIG. 7 is a diagram illustrating a message sequence chart for parallel ICBM and LLM configuration in an inter-DU scenario where ICBM is intra-target-DU.

Another example may be seen with regard to FIG. 7. FIG. shows an example message sequence chart for parallel ICBM and LLM configuration in inter-DU scenario where ICBM is intra-target-DU. Serving DU 0 controls cell 1. Target DU 1 controls cell 2 and cell 3. As seen with step 4, the target DU 1 may be configured to determine to add ICBM for a cell (cell 3 in this example) with LLM configuring. At step 5, the target DU 1 may signal the serving CU with UE context setup confirmation and LLM for cell 2, and also ICBM configuration of non-serving cell 3 for serving cell 2, and perhaps (for option 1 noted below) a radio condition to trigger LLM for cell 2 with ICBM to cell 3. As seen with regard to step 6, the serving CU may be configured with either a first option or a second option, or an ability to select either of the first or second options. With the first option the serving CU may determine to forward the trigger for LLM with ICBM from the target DU. With the second option, the serving CU may determine the trigger itself for LLM with ICBM. At step 7 the serving CU may signal the serving DU and the UE with the RRCReconfuration for LLM for cell 2 and also ICBM configuration of non-serving cell 3 for serving cell 2 inside the current cell configuration. In regard to option 2 noted in step 6, step 9 may be sent along message 7. The serving CU may signal the serving DU at step 9 with an optional radio condition to trigger LLM with ICBM. In an alternate example, step 9 might not be sent along message 7. Steps 10-11 may be performed, but with step 12 the serving DU may determine to trigger LLM with ICBM to cell 3 using the condition indicated by the serving CU. At step 13 the serving DU may signal the UE with a MAC CE for LLM to cell 2 and also signal for ICBM to cell 3. With this, the UE may then, as indicated in step 14, initiate LLM with cell and initiate ICBM with cell 3.

With features as described herein, after measurement reports, the CU may determine to configure LLM for the UE. The CU may contact the serving DU (target DU in inter DU LLM scenario) to obtain the LLM configuration of the target cell (cell 2 in the examples of FIGS. 5-7). The target DU may send the ICBM configuration for the target cell along with the LLM configuration. The LTM configuration is for cell 2 and ICBM configuration for the serving cell 1. The ICBM configuration may be activated once the LTM is executed; cell-1 becomes non-serving and UE uses beam of cell-1 via this ICBM configuration. The configurations may be operated sequentially. This may be done, for example, by providing (e.g., indicating) appropriate TCI state associated with the ICBM non-serving cell determined by the target cell. The non-serving cell and the target cell are not equal. Here, the non-serving cell refers to the state of the UE after LTM. Once the UE executes the LTM, the serving cell of the UE (cell-1) becomes the non-serving cell. At the time of ICBM preparation, the target cell sees the cell-1 as non-serving cell (for use in the future). Since the ICBM is configured by the serving cell, and the target cell (cell-2) will be the serving cell, the TCI state may be determined by the target cell. The target DU may determine to add ICBM configuration using the measurement reports provided by the CU. In regard to triggering the DU to configure ICBM in addition to the requested LLM, in the examples noted above, this may be provided in options such as it can be either the CU that determines or the DU that determines. In either case, it can be based on the measurements that are reported by the UE at the beginning of LTM preparation or it can be a learnt mobility characteristics of the cell border (such as, for example, the network can identify if the cell border requires or should have LTM+ICBM).

The CU may indicate the LLM configuration to the UE along with the ICBM configuration to the UE. In the case of the ICBM for another cell, then the source cell (i.e., ICBM non-serving cell different from the source cell) may be provided to the UE, and the ICBM configuration may be provided in an independent way (other than the LLM configuration) such that the UE can use it with the other serving cells as well.

The UE may monitor and report L1 measurement configuration according to the LLM configuration. The UE may be configured to report the beam measurements for the ICBM cell inside the LLM configuration. This does not need to be a new measurement, but instead may be a concatenated measurement report such as, for example, when LTM is configured the cell-2 can also configure the ICBM beam measurements. It does not need to be a new type of message, but instead may be a new structure. It also makes association of the measurements to events (e.g., to LTM) easy.

The DU may monitor and determine to initiate LLM with or without initiating ICBM. The DU may be configured with a condition to trigger the LLM with or without ICBM by the target DU or the CU. The condition might not be a totally new condition such as, for example, the CU or target DU may configure one of the existing conditions that are already used today. However, there may be a condition that is defined to determine whether the serving cell should trigger only LTM or LTM with ICBM. There is no such configuration in the past. Therefore, in the past, there was no condition requirement to distinguish which type of LTM to be executed.

The DU may indicate the cell change and indicate whether the UE should start ICBM or not with the cell change. The UE may use this indication to initiate cell change and to initiate ICBM or not with the serving cell change.

Features as described herein may be used in regard to 5G New Radio and, in particular, Multi-RAT Mobility (MRM) concept targeted for 3GPP Rel-18 and beyond which enables and improves mobility/cell-changes in RAN. Low layer mobility (LLM) is one of the objectives for mobility enhancement in Rel. 18. In contrast to L3 mobility procedures where the handover between two cells is decided by RRC layer, LLM decision is made by the MAC layer terminated in the Distributed Unit (DU) based on L1 measurement reports. Previously, configuring ICBM was designed to occur after LLM execution. The UE was initially configured with LLM mobility towards the target cell and, afterwards, once the LLM was executed, the DU then determine if ICBM needs to be initiated. ICBM then needed to be prepared and, once prepared, than it could be initiated. This might result in limited use of a feature because the preparation of LLM did not cover preparation to initiate ICBM at the time of the LLM execution.

With features as described herein, a method may be provided to enable low layer mobility in relation with ICBM (combining both procedures into one procedure) where the UE may operate LLM and ICBM in parallel. The serving CU may determine to initiate LLM towards a target cell. The target DU (source DU in intra-DU scenario) may determine to configure ICBM for the target cell inside the LLM configuration. The UE is able to initiate LLM and ICBM at a same time for the target cell and a non-serving target cell.

The target DU may prepare the LLM configuration for the UE to enter into a target cell of target DU and prepare ICBM configuration within the serving cell for the UE which will be applied by the UE after switching to the target cell as new serving cell and may maintain beams of the previous serving cell for ICBM operation.

Features as described herein enable the configuration of LTM and ICBM in parallel by a target DU; with the LTM configuration for a target cell (cell 2) and the ICBM configuration for a further non-serving cell (cell 1). The ICBM configuration may be activated once the LTM is executed (cell-1 becomes non-serving and UE uses beam of cell-1 via the ICBM configuration). After measurement reports, the CU may determine to configure LLM for the UE. The CU may contact the serving DU (target DU in inter DU LLM scenario) to obtain LLM configuration of a target cell 2. The target DU may send the ICBM configuration for a further target cell 1 along with the LLM configuration of the target cell 2. This may be done, for example, by providing (e.g., indicating) appropriate TCI state associated with the ICBM non-serving cell 1 determined by the target cell. The target DU may determine to add the ICBM configuration using the measurement reports provided by the CU.

Features may be triggered by a measurement report from UE, and the serving CU may determine to initiate LLM towards a target cell and receive LLM configuration from target DU which may include a ICBM configuration for a further target cell; The serving CU/DU may instruct UE whether to initiate 1. LLM or 2. LLM with ICBM when providing the LLM configuration of the target cell towards UE. The instruction may be dependent on a condition which the serving DU or the UE may determine when triggering/initiating the LLM with or without ICBM.

The target DU (source DU in intra-DU scenario) may determine to configure ICBM in addition to the configuration of LLM for a target cell inside the LLM configuration procedure. Target cell for ICBM is different to target cell for LLM. If both target cells are served by the same target DU, it allows to include ICBM configuration into LLM configuration procedure; and the target DU may provide a combined configuration for LLM and ICBM to the serving CU.

The UE is capable to initiate LLM for the target cell (which becomes serving cell after LLM) and at the same time (after LLM) ICBM for a non-serving target cell. The UE may monitor and report L1 measurement configuration according to the LLM configuration. The UE may be configured to report the beam measurements for the ICBM cell inside the LLM configuration.

The serving DU may monitor and determines to initiate LLM with or without initiating ICBM. The serving DU may be configured with a condition to trigger the LLM with or without ICBM by the target DU or the CU. The serving DU may indicate the cell change and indicate whether UE should start ICBM or not with the cell change. The UE may use this indication to initiate cell change and to initiate ICBM or not with the serving cell change.

In accordance with one example embodiment, an example apparatus is provided comprising: at least one processor; and at least one non-transitory memory storing instructions that, when executed with the at least one processor, cause the apparatus to perform: receiving a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

The instructions, when executed with the at least one processor, may cause the apparatus to perform: receiving of an indication to trigger use of both the first information and the second information to provide the communication of the apparatus with the another cell at least partially during the handover to the second cell.

In accordance with one example embodiment, an example method is provided comprising: receiving with an apparatus a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

The method may further comprise receiving, with the apparatus, an indication to trigger use of both the first information and the second information to provide the communication of the apparatus with the another cell at least partially during the handover to the second cell.

In accordance with one example embodiment, an example apparatus is provided comprising a non-transitory computer readable medium comprising program instructions that, when executed with an apparatus, cause the apparatus to perform at least the following: receiving with the apparatus a combined information, where the combined information comprises first information regarding inter-cell beam management and second information regarding lower layer mobility; using the second information to initiate a handover of the apparatus from a first cell to a second cell; and using the first information to provide communication of the apparatus with another cell at least partially during the handover to the second cell, where the another cell comprises the first cell or a third cell.

In accordance with one example embodiment, an example apparatus is provided comprising: means for receiving with the apparatus a combined information, where the combined information comprises first information regarding inter-cell beam management and second information regarding lower layer mobility; means for using the second information to initiate a handover of the apparatus from a first cell to a second cell; and means for using the first information to provide communication of the apparatus with another cell at least partially during the handover to the second cell, where the another cell comprises the first cell or a third cell.

In accordance with one example embodiment, an example apparatus is provided comprising: at least one processor; and at least one non-transitory memory storing instructions that, when executed with the at least one processor, cause the apparatus to perform: determining to add first information regarding inter-cell beam management with second information regarding lower layer mobility; and based upon the determining to add the first information with the second information, sending the first information and the second information together to a network entity.

The determining to add the first information regarding inter-cell beam management with the second information regarding lower layer mobility may happen related to a condition configured by the CU to the source DU. The determining may come over the CU to the source DU to determine properly. The source DU may receive and determine accordingly. The condition may indicate a radio condition for the ICBM cell and the LLM cell.

The second information may be in regard to a handover from a first cell to a second cell, and where the inter-cell beam management is in regard to the first cell or a third cell. The third cell may be at least partially controlled with the apparatus. The third cell may be at least partially controlled with a different apparatus, and where the different apparatus comprises a source distributed unit (DU), or a target distributed unit (DU), or a third distributed unit (DU) which is different from the source distributed unit and the target distributed unit. The apparatus may comprise a serving distributed unit (DU) at least partially controlling a first cell and a second cell, and where the second information is in regard to a handover from the first cell to the second cell. The first information may be in regard to communication of a user equipment with another cell at least partially during the handover of the user equipment to the second cell, where the another cell comprises the first cell or a third cell. The apparatus may comprise a target distributed unit (DU) at least partially controlling a second cell, and where the second information is in regard to a handover from a first cell to the second cell, where the first cell is controlled at least partially with a serving distributed unit (DU). The inter-cell beam management may be in regard to a third cell, where the third cell is: at least partially controlled with the target distributed unit (DU), or at least partially controlled with another target distributed unit (DU). The instructions, when executed with the at least one processor, may cause the apparatus to perform: receiving beam information from a user equipment; and based, at least partially, upon the receiving of the beam information from the user equipment, determining to trigger the lower layer mobility with the inter-cell beam management. The instructions, when executed with the at least one processor, cause the apparatus to perform: sending, based upon the determining to trigger the lower layer mobility with the inter-cell beam management, a signal to the user equipment, to cause the user equipment to initiate a handover of the user equipment from a first cell to a second cell, and cause the user equipment to provide inter-cell beam management communication of the user equipment with another cell during handover to the second cell. The another cell may be the first cell or a third cell. The beam information may comprise a radio measurement of the UE for the first second and the third cell. The beam information may be based upon interference, and a pure radio measurement can also be timing advance information. The beam information may information conventionally used to determine conditional handover.

In accordance with one example embodiment, an example method is provided comprising: determining to add first information regarding inter-cell beam management with second information regarding lower layer mobility; and based upon the determining to add the first information with the second information, sending the first information and the second information together to a network entity.

In accordance with one example embodiment, an example apparatus is provided comprising a non-transitory computer readable medium comprising program instructions that, when executed with an apparatus, cause the apparatus to perform at least the following: determining to add first information regarding inter-cell beam management with second information regarding lower layer mobility; and based upon the determining to add the first information with the second information, sending the first information and the second information together to a network entity.

In accordance with one example embodiment, an example apparatus is provided comprising: means for determining to add first information regarding inter-cell beam management with second information regarding lower layer mobility; and means for, based upon the determining to add the first information with the second information, sending the first information and the second information together to a network entity.

In accordance with one example embodiment, an example apparatus is provided comprising: at least one processor; and at least one non-transitory memory storing instructions that, when executed with the at least one processor, cause the apparatus to perform: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

The another cell may comprise the first cell or a third cell. The mobility information may comprise indicating a transmission configuration indicator (TCI) state of the another cell to be used during execution of the handover. The apparatus may be a serving distributed unit (DU), where the serving distributed unit at least partially controls the first cell, and where the another cell comprises a third cell. The third cell may be at least partially controlled with a target distributed unit (DU). The second cell may be at least partially controlled with the target distributed unit (DU). The second cell may be at least partially controlled with another target distributed unit (DU).

In accordance with one example embodiment, an example method is provided comprising: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with one example embodiment, an example apparatus is provided comprising a non-transitory computer readable medium comprising program instructions that, when executed with an apparatus, cause the apparatus to perform at least the following: receiving beam information from a user equipment; based, at least partially, upon the receiving of the beam information from the user equipment, determining to trigger lower layer mobility with inter-cell beam management; and sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with one example embodiment, an example apparatus is provided comprising: means for receiving beam information from a user equipment; and means for, based at least partially upon the receiving of the beam information from the user equipment, determining to trigger lower layer mobility with inter-cell beam management; and means for sending mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

In accordance with one example embodiment, an example apparatus is provided comprising: at least one processor; and at least one non-transitory memory storing instructions that, when executed with the at least one processor, cause the apparatus to perform: receiving, from a network entity, first information for inter-cell beam management and second information for lower layer mobility; and determining, based upon the receiving of the first information for inter-cell beam management and second information for lower layer mobility, mobility information to be sent from the apparatus.

The mobility information may comprises the first and second information. The mobility information may comprise an indication for the network entity, or another network entity, to determine to trigger the inter-cell beam management at least partially during the lower layer mobility. The mobility information may comprise an indication for the network entity, or another network entity, to determine to not trigger the inter-cell beam management during the lower layer mobility. The mobility information may comprise an indication for the network entity, or another network entity, to determine a trigger for performing the inter-cell beam management during the lower layer mobility. The determining may comprise determining a trigger for performing the inter-cell beam management during the lower layer mobility to be included as part of the mobility information. The trigger may comprise a trigger condition for triggering the performing of the inter-cell beam management at least partially during the lower layer mobility, where the instructions, when executed with the at least one processor, cause the apparatus to perform sending of the trigger condition from the apparatus. The instructions, when executed with the at least one processor, may cause the apparatus to perform: sending the mobility information to the network entity for the network entity and for a user equipment, or sending the mobility information to another network entity for the another network entity and for the user equipment. The apparatus may be a serving central unit (CU), and where the network entity is a serving distributed unit (DU). The apparatus may be a serving central unit (CU), and where the network entity is a target distributed unit (DU). The apparatus may be a serving central unit (CU), and where the another network entity is a serving distributed unit (DU). The apparatus may be a target distributed unit (DU), and where the instructions, when executed with the at least one processor, cause the apparatus to perform: sending the mobility information to a serving central unit (CU).

In accordance with one example embodiment, an example method is provided comprising: receiving from a network entity first information for inter-cell beam management and second information for lower layer mobility; and determining, based upon the receiving of the first information for inter-cell beam management and second information for lower layer mobility, mobility information to be sent from the apparatus.

In accordance with one example embodiment, an example apparatus is provided comprising a non-transitory computer readable medium comprising program instructions that, when executed with an apparatus, cause the apparatus to perform at least the following: receiving from a network entity first information for inter-cell beam management and second information for lower layer mobility; and determining, based upon the receiving of the first information for inter-cell beam management and second information for lower layer mobility, mobility information to be sent from the apparatus.

In accordance with one example embodiment, an example apparatus is provided comprising: means for receiving from a network entity first information for inter-cell beam management and second information for lower layer mobility; and means for determining, based upon the receiving of the first information for inter-cell beam management and second information for lower layer mobility, mobility information to be sent from the apparatus.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
    (iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
  at least one processor; and
  at least one memory storing instructions that, when executed with the at least one processor, cause the apparatus to perform:
    receiving a combined information, where the combined information comprises first information regarding inter-cell beam management and second information regarding lower layer mobility;
    using the second information to initiate a handover of the apparatus from a first cell to a second cell; and using the first information to provide communication of the apparatus with another cell at least partially during the handover to the second cell, where the another cell comprises the first cell or a third cell.

2. The apparatus as claimed in claim 1 where the instructions, when executed with the at least one processor, cause the apparatus to perform:
receiving of an indication to trigger use of both the first information and the second information to provide the communication of the apparatus with the another cell at least partially during the handover to the second cell.

3. A method comprising:
receiving with an apparatus a combined information, where the combined information comprises first information regarding inter-cell beam management and second information regarding lower layer mobility;
using the second information to initiate a handover of the apparatus from a first cell to a second cell; and
using the first information to provide communication of the apparatus with another cell at least partially during the handover to the second cell, where the another cell comprises the first cell or a third cell.

4. The method as in claim 3 further comprising receiving, with the apparatus, an indication to trigger use of both the first information and the second information to provide the communication of the apparatus with the another cell at least partially during the handover to the second cell.

5. An apparatus comprising:
at least one processor; and
at least one memory storing instructions that, when executed with the at least one processor, cause the apparatus to perform:
determining to add first information regarding inter-cell beam management with second information regarding lower layer mobility;
based upon the determining to add the first information with the second information, sending the first information and the second information together to a network entity.

6. The apparatus as claimed in claim 5 where the second information is in regard to a handover from a first cell to a second cell, and where the inter-cell beam management is in regard to the first cell or a third cell.

7. The apparatus as claimed in claim 6 where the third cell is at least partially controlled with the apparatus.

8. The apparatus as claimed in claim 6 where the third cell is at least partially controlled with a different apparatus, and where the different apparatus comprises a source distributed unit (DU), or a target distributed unit (DU), or a third distributed unit (DU) which is different from the source distributed unit and the target distributed unit.

9. The apparatus as claimed in claim 5 where the apparatus comprises a serving distributed unit (DU) at least partially controlling a first cell and a second cell, and where the second information is in regard to a handover from the first cell to the second cell.

10. The apparatus as claimed in claim 9 where the first information is in regard to communication of a user equipment with another cell at least partially during the handover of the user equipment to the second cell, where the another cell comprises the first cell or a third cell.

11. The apparatus as claimed in claim 5 where the apparatus comprises a target distributed unit (DU) at least partially controlling a second cell, and where the second information is in regard to a handover from a first cell to the second cell, where the first cell is controlled at least partially with a serving distributed unit (DU).

12. The apparatus as claimed in claim 11 where the inter-cell beam management is in regard to a third cell, where the third cell is:
at least partially controlled with the target distributed unit (DU), or
at least partially controlled with another target distributed unit (DU).

13. The apparatus as claimed in claim 5 where the instructions, when executed with the at least one processor, cause the apparatus to perform:
receiving beam information from a user equipment;
based, at least partially, upon the receiving of the beam information from the user equipment, determining to trigger the lower layer mobility with the inter-cell beam management.

14. The apparatus as claimed in claim 13 where the instructions, when executed with the at least one processor, cause the apparatus to perform:
sending, based upon the determining to trigger the lower layer mobility with the inter-cell beam management, a signal to the user equipment, to cause the user equipment to initiate a handover of the user equipment from a first cell to a second cell, and cause the user equipment to provide inter-cell beam management communication of the user equipment with another cell during handover to the second cell.

15. The apparatus as claimed in claim 13 where the another cell is the first cell or a third cell.

16. An apparatus comprising:
at least one processor; and
at least one memory storing instructions that, when executed with the at least one processor, cause the apparatus to perform:
receiving beam information from a user equipment;
based, at least partially, upon the receiving of the beam information from the user equipment, determining to add first information for inter-cell beam management with second information for lower layer mobility; and
sending the first and second information as mobility information to the user equipment, where the mobility information is configured to, at least partially, enable the user equipment to initiate a handover of the user equipment from a first cell to a second cell, and enable the user equipment to provide communication of the user equipment with another cell during handover to the second cell.

17. The apparatus as claimed in claim 16 where the another cell comprises the first cell or a third cell.

18. The apparatus as claimed in claim 16 where the mobility information comprises indicating a transmission configuration indicator (TCI) state of the another cell to be used during execution of the handover.

19. The apparatus as claimed in claim 16 where the apparatus is a serving distributed unit (DU), where the serving distributed unit at least partially controls the first cell, and where the another cell comprises a third cell.

20. The apparatus as claimed in claim 19 where the third cell is at least partially controlled with a target distributed unit (DU).

21. The apparatus as claimed in claim 20 where the second cell is at least partially controlled with the target distributed unit (DU).

22. The apparatus as claimed in claim 20 where the second cell is at least partially controlled with another target distributed unit (DU).

23. An apparatus comprising:
   at least one processor; and
   at least one memory storing instructions that, when executed with the at least one processor, cause the apparatus to perform:
      receiving, from a network entity, first information for inter-cell beam management and second information for lower layer mobility; and
      determining, based upon the receiving of the first information for inter-cell beam management and second information for lower layer mobility, mobility information to be sent from the apparatus.

24. The apparatus as claimed in claim 23 where the mobility information comprises the first and second information.

25. The apparatus as claimed in claim 23 where the mobility information comprises an indication for the network entity, or another network entity, to determine to trigger the inter-cell beam management at least partially during the lower layer mobility.

26. The apparatus as claimed in claim 23 where the mobility information comprises an indication for the network entity, or another network entity, to determine to not trigger the inter-cell beam management during the lower layer mobility.

27. The apparatus as claimed in claim 23 where the mobility information comprises an indication for the network entity, or another network entity, to determine a trigger for performing the inter-cell beam management during the lower layer mobility.

28. The apparatus as claimed in claim 23 where the determining comprises determining a trigger for performing the inter-cell beam management during the lower layer mobility to be included as part of the mobility information.

29. The apparatus as claimed in claim 28 where the trigger comprises a trigger condition for triggering the performing of the inter-cell beam management at least partially during the lower layer mobility, where the instructions, when executed with the at least one processor, cause the apparatus to perform sending of the trigger condition from the apparatus.

30. The apparatus as claimed in claim 23 where the instructions, when executed with the at least one processor, cause the apparatus to perform:
   sending the mobility information to the network entity for the network entity and for a user equipment, or sending the mobility information to another network entity for the another network entity and for the user equipment.

31. The apparatus as claimed in claim 30 where the apparatus is a serving central unit (CU), and where the network entity is a serving distributed unit (DU).

32. The apparatus as claimed in claim 30 where the apparatus is a serving central unit (CU), and where the network entity is a target distributed unit (DU).

33. The apparatus as claimed in claim 32 where the apparatus is a serving central unit (CU), and where the another network entity is a serving distributed unit (DU).

34. The apparatus as claimed in claim 23 where the apparatus is a target distributed unit (DU), and where the instructions, when executed with the at least one processor, cause the apparatus to perform:
   sending the mobility information to a serving central unit (CU).

* * * * *